United States Patent [19]

Rawle

[11] Patent Number: 4,765,783
[45] Date of Patent: * Aug. 23, 1988

[54] FACE MILLING CUTTER

[75] Inventor: Ralph H. Rawle, Windsor, Canada

[73] Assignee: J. P. Tool Limited, Windsor, Canada

[*] Notice: The portion of the term of this patent subsequent to May 6, 2003 has been disclaimed.

[21] Appl. No.: 46,148

[22] Filed: May 5, 1987

[51] Int. Cl.$^4$ ................................................ B23C 5/20
[52] U.S. Cl. .......................................... 407/41; 407/49
[58] Field of Search .................... 407/41, 49, 34, 35, 407/36, 37, 38, 39, 40, 55

[56] References Cited

U.S. PATENT DOCUMENTS

| | | | |
|---|---|---|---|
| 1,348,279 | 8/1920 | Heywood | 407/49 |
| 2,761,196 | 9/1956 | Graves | 407/34 |
| 4,456,307 | 6/1984 | Merten | 407/49 |
| 4,586,855 | 5/1986 | Rawle | 407/55 |
| 4,626,150 | 12/1986 | Dapiran | 407/36 |

Primary Examiner—Frederick R. Schmidt
Assistant Examiner—Blynn Shideler

[57] ABSTRACT

A face milling tool is described having a rotatable holder with a plurality of cutting inserts detachably secured to an end face in a circumferentially spaced and axially and radially stepped relation. Each insert is mounted in a pocket formed in the holder end face, the pocket having a deep wedge receiving portion and an adjacent shallower cutting insert retaining portion. The insert retaining portion includes a flat side wall against which a cutting insert rests. The wedge receiving portion includes a concave side wall portion opposite the flat side wall and a bottom wall with a tapped hole. Each wedge includes a first side face with a convex projection for sliding movement upwardly and downwardly within the concave side wall portion and a flat second side face opposite the first side face for engaging a side face of an insert. A vertical abutment shoulder projects outwardly from one end of the flat second side face of the wedge and this shoulder is adapted to abut an end face of the insert. A tapped hole extends vertically through the wedge and a screw extending through the wedge hole and into the tapped hole in the bottom of the pocket pulls the wedge downwardly, wedging the insert against the pocket flat side wall, thereby precisely locating and holding each insert both axially and radially.

5 Claims, 2 Drawing Sheets

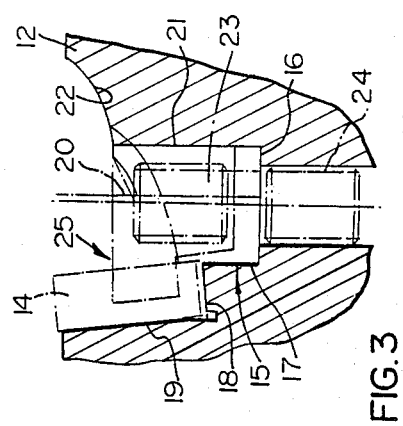
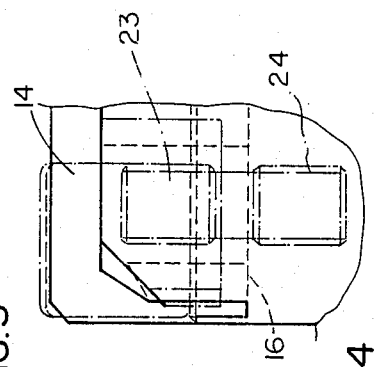
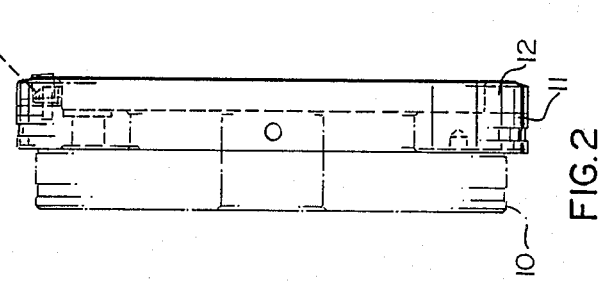
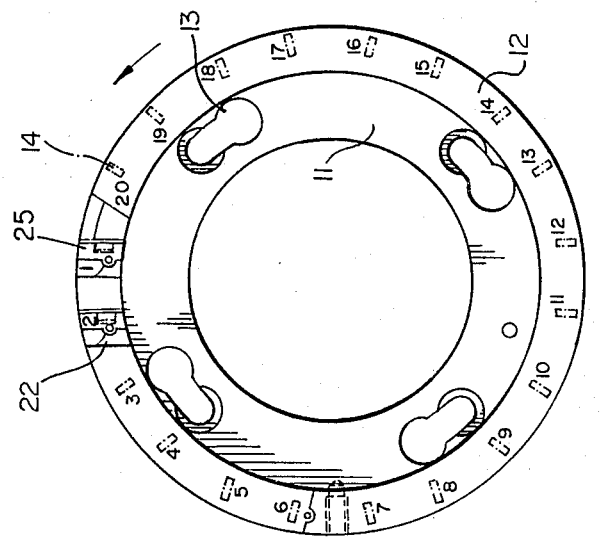
FIG. 3
FIG. 4
FIG. 2
FIG. 1

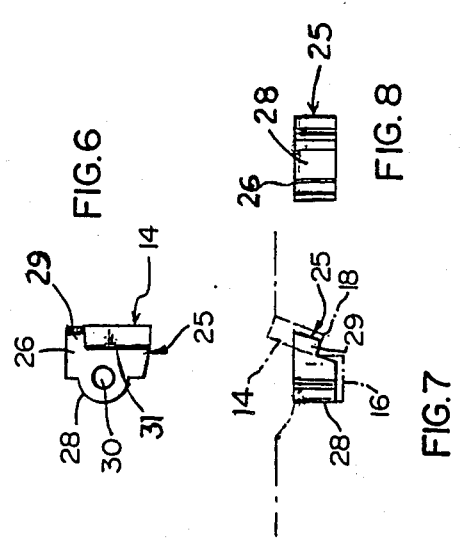
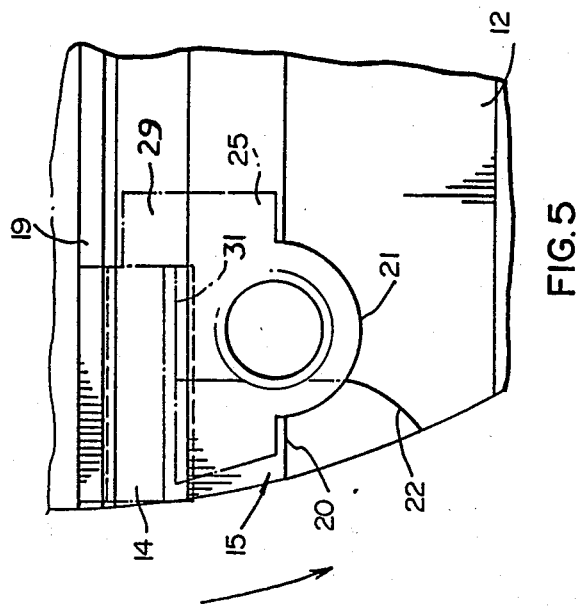

FACE MILLING CUTTER

BACKGROUND OF THE INVENTION

This invention relates to milling cutters and, more particularly to face milling tools primarily for metals.

A typical milling tool comprises a holder securable to the end of a rotating spindle in a predetermined relationship to the axis of rotation thereof and a short cutting edge carried by the holder at a radial distance from the axis of rotation on the side of the holder away from the spindle, so that as the body is rotated by the spindle, the cutting edge describes a circle about the axis of the spindle. All parts of the holder are axially and radially behind the cutting edge so that it is free to engage and machine the surface of a workpiece held in the machine in which the spindle rotates. Since the cutting edge is short, it takes a comparatively narrow cut and the tool is used with a transverse feed, i.e. the feed direction is parallel to the machined surface of the workpiece.

It has in the past been proposed to make a tool bit of wafer-like form for a variety of metal cutting tools. In other words, it is bounded by two generally flat parallel end faces and a side wall and has at least one cutting edge formed by part of the edge at the junction of the side wall and at least one of the end faces. It is of a thickness which is small compared to other dimensions and is typically secured detachably to a holder by means transversing a central aperture through it. If such a bit is of simple form and small size, it is cheap to produce and it is therefore economic to throw it away when blunt or worn rather than regrinding it, especially if it can be indexed to bring each of a plurality of cutting edge sections or cutting edges into cutting position.

In general terms, the two surfaces at the junction of which the cutting edge of a metal cutting tool is formed, are (a) the rake face against which the chip impinges and (b) the clearance face which is the face which is closer to the workpiece and which is inclined to the machined surface at a low angle which takes it out of contact with workpiece behind the cut. In the case of a wafer-like cutter as described above, according to the way it is located by the holder and the machine, it is possible for one end face to be the rake face and the side wall to be the clearance face, or for the side wall to be the rake face and the end face to be the clearance face. In the specific case of face milling cutters, nearly always a wafer-like cutter has been located so that the end face is the rake face and the side wall is the clearance face.

Nearly every milling operation consists of an interrupted cut. Normally, each cutting insert is in the cut less than half of the total machining time and, while the insert is in the cut, the thickness of the chip being formed constantly changes because of the dual motion, i.e. cutter rotation and workpiece feed motion, which is characteristic of the milling process. These features of milling operations result in the following cutting conditions:

1. As each insert enters the cut, it is subjected to a mechanical shock load. The magnitude of this shock load depends upon the workpiece material, cutter position, operating conditions and cutter geometry.

2. Cutting forces are cyclical, and are roughly proportional at any position in the cut to the undeformed chip thickness at that position. In a typical milling operation, undeformed chip thickness at insert entry is about 80% of the feed per insert, so forces begin high, build up gradually and finally peak as the insert crosses the feed axis, i.e. the point at which unformed chip thickness is at a maximum. Forces decline throughout the rest of the cut as undeformed chip thickness is constantly reduced. As the insert leaves the cut, forces drop to zero and remain there until the insert enters the cut again on the next spindle revolution.

3. Heat generated in the machining operation is also roughly proportional to the undeformed chip thickness. Thus, it is roughly proportional to the rapidly changing cutting forces. Such rapid changes in generated heat place a severe strain upon the cutting material and can lead to thermal cracking.

As an example of one of the previous milling cutters there can be mentioned the face milling tool described in U.S. Pat. No. 3,670,380, issued June 20, 1972. This tool utilizes a single face cutting insert of circular or lobed outline which is utilized essentially as a finishing insert. Thus, the disclosure of that patent points out that if the depth of material to be removed at one pass is greater than the insert can deal with, the holder can also carry one or more roughing bits which precede the circular or lobed insert.

It is highly desirable in certain operations to be able to use cutting inserts made from silicon nitride. This material is exceedingly hard, but it does present the problem that it is not possible to form a central aperture through the inserts for mounting to a holder.

It is an object of the present invention to provide a convenient means for mounting wafer-like cutting inserts on a holder without the need of apertures through the inserts.

SUMMARY OF THE INVENTION

The present invention relates to a face milling tool comprising a holder securable to the end of a rotatable spindle. A plurality of cutting inserts, each having at least one cutting edge, are detachably secured to the end face of the holder at a radial distance from the axis of the spindle. The cutting edges of the inserts extend outwardly of the holder end face such that the cutting edges are free to engage and machine the surface of a workpiece. The inserts are of a wafer-like form and means are provided for detachably securing the inserts to the holder by means of special wedges. The cutting edge of each insert is substantially straight, being formed by a portion of an edge at the intersection of the insert side wall and the end face. Each insert lies at such an angle to the plane of the workpiece that the insert end face forms a rake face and the side wall of the insert forms a clearance face making a low angle to the plane of the workpiece disposed perpendicularly to the spindle axis. The straight cutting edge makes a small angle with a radius intersecting the cutting edge and the spindle axis, this being referred to hereinafter as the shear angle. The inserts are circumferentially spaced around the holder and are axially and radially stepped to form both an axial and radial progression, whereby each insert removes a shallow uniform workpiece chip and the material is removed progressively from the top surface of a workpiece down to a finished surface in controlled, shallow, axial increments.

A main feature of this invention is the manner in which the inserts are secured to the holder. As mentioned above, it was necessary to do this without providing a central aperture in the inserts, and this presented a problem in being able to removably mount the inserts in an axial and radial stepped progression. This problem has been solved according to this invention by providing a series of circumferentially spaced insert slots or pockets in the end face of the holder. Each pocket preferably includes a deep portion for receiving a wedge and an adjacent shallower portion for retaining a cutting insert. The insert retaining portion includes a flat side wall which fixes the orientation of each insert, including any radial shear angle, and also the rake angle of each insert. The wedge receiving portion of the pocket includes a downwardly extending concave side wall portion opposite said pocket flat side wall and a bottom wall with a tapped hole extending thereinto.

Each wedge includes a first side face with a convex projection for movement upwardly and downwardly within the pocket concave side wall portion and a flat second side face opposite the first side face for engaging a side face of an insert. A vertical abutment shoulder projects outwardly from one end of the flat second side face and this shoulder is adapted to abut an end face of an insert and fix the radial distance of each insert from the spindle axis. The wedge also includes a tapped hole extending vertically therethrough. A dual-thread screw extending through the tapped wedge hole and into the tapped hole in the bottom of pocket pulls the wedge downwardly, wedging the insert against the pocket flat side wall, thereby precisely locating each insert both axially and radially. By providing the screw with both a left hand and a right hand thread, the wedge can be lifted out of the pocket simply by turning the screw in the reverse direction.

As stated above, the inserts are preferably circumferentially spaced around the holder and are axially and radially stepped to form both an axial and radial progression. Preferably each axial step is less than about 0.01 inch, with axial steps in the range of 0.002 to 0.005 inch being particularly preferred with cast iron or steel workpieces.

With the axial and radial stepped configuration, a spiralling effect is created with only one insert serving as a finishing insert. The number of inserts required is based on the stock removal and the axial step or chip load. The axial geometry of the inserts is arranged to suit the insert style and the metal being machined and the radial geometry is arranged to eliminate harmonics and minimize breakout.

DESCRIPTION OF THE PREFERRED EMBODIMENTS

Certain preferred embodiments of the invention will be further described with reference to the accompanying drawings in which:

FIG. 1 is a plan view from below of a face milling tool of the present invention;

FIG. 2 is a side elevation of the milling tool of FIG. 1;

FIG. 3 is a partial sectional view of one cutting insert mounting;

FIG. 4 is a further partial sectional view of an insert mounting;

FIG. 5 is a top plan view of a single cutting insert mounting;

FIG. 6 is a top plan view of a mounting wedge;

FIG. 7 is a side elevation of a mounting wedge; and

FIG. 8 is an end view of a mounting wedge.

The face milling tool in accordance with the invention shown in FIGS. 1 and 2 comprises a body or holder mounted on a spindle 10. The holder has a rim portion 12 with an annular face, an inwardly stepped annular portion 11 and a central hole. The holder is mounted to the spindle 10 by means of screws which pass through the slotted holes 13.

In the face of the rim portion 12 are mounted a series of cutter inserts 14. Each insert is mounted within a mounting pocket 15 formed within rim portion 12.

Each pocket 15 includes a deep portion for receiving wedge 25 and a shallower portion for retaining a cutting insert 14. The deep portion includes a flat bottom face 16 and a stepped portion including a short vertical wall 17 and a sloped bottom ledge portion 18 forming the bottom of the insert retaining portion. The ledge portion 18 fixes the axial position of each insert. Extending upwardly from ledge 18 is a flat wall 19 positioned preferably at an angle of 7° to the axis of the spindle.

The wall of the pocket opposite wall 19 has a concave, preferably semi-cylindrical, recess 21 commencing at line 20 and extending downwardly. Adjacent the upper portion of the pocket is a chip relief 22 and in the bottom wall 16 of the pocket is a tapped hole 24.

Mounted within pocket 15 is a wedge member 25, the details of which can best be seen from FIGS. 6, 7 and 8. The wedge 25 has a flat top portion 26. One side wall has a convex projection 28 adapted to mate with the pocket concave recess 21, while the opposite side has a flat face portion 31 for engaging a side face of insert 14. At one side of flat face 31 is a projecting abutment shoulder 29 for engaging a side edge of insert 14 to fix the radial location.

A tapped hole 30 extends vertically through the wedge and the flat face 31 has an appropriate taper such that when a screw 23 is inserted into the tapped wedge hole 30 and the tapped hole 24, this pulls the wedge downwardly into pocket 15, pressing the cutting insert 14 against wall 19.

As will be seen from FIG. 3, each insert 14 is set at a rake angle $\beta$ relative to the surface of the workpiece as determined by the angle of pocket face 19. This angle is typically less than 15° and is usually in the order of about 7°. Each insert 14 also forms a clearance face which lies at an angle $\theta$ of less than 15° to the end of the holder.

The inserts are mounted such that the straight cutting edge makes a small radial shear angle $\alpha$. Preferably these shear angles progressively alternate between small positive and negative angles. The shear angles can each be up to about 15° with about 7° being ideal.

The inserts can be made in a variety of shapes and sizes with square, rectangular or triangular being generally preferred. The size of the inserts is generally based on the feed per revolution to fully utilize the available cutting edge. They are also preferably indexable and, for instance, a square insert may have eight cutting edges and preferably has bevelled, radius or sharp corners.

A unit was utilized of the type shown in FIG. 1 with 20 equally spaced inserts. Square inserts were used which were ½" square and 3/16" (0.1875") thick. The inserts were mounted at a rake angle $\beta$ of 7° and alternating negative and positive radial shear angles $\alpha$ of 7° C. The inserts were axially stepped by a distance x of 0.002 inch and radially stepped by an amount of 0.020 inch. The twenty stepped inserts are shown by the numerals 1–20 with insert #1 removing the last chip and insert #20 removing the first chip. Each chip has a thickness of 0.002 inch and the radial step in on the part is 0.020 inch. The total depth of cut between the workpiece finished face and the top surface of the material to be removed is 0.040 inch.

The spindle was rotated at 795 rpm giving a cutter rate of 2601 surface feet per minute. With this arrangement the workpiece could be fed at a feed rate of 0.120 inch per revolution or 0.006 inch per insert. This provided a workpiece feed rate of 95.4 inches per minute at 13.3 horsepower.

I claim:

1. A face milling tool used to machine a workpiece comprising:
   a rotatable spindle;
   a holder which is securable to said rotatable spindle, said holder having an end face lying substantially perpendicular to the longitudinal axis of said spindle;
   a plurality of cutting inserts detachably secured at said end face of said holder at a radial distance from the axis of the spindle in a circumferentially spaced and axially and radially stepped relation to form both an axial and radial progression;
   said inserts having a wafer-like form with first and second end faces and a sidewall, said inserts also having at least one substantially straight cutting edge formed by the intersection of an end face and a portion of the sidewall, said cutting edge of each insert lying substantially perpendicular to said spindle axis and at a radial shear angle of less than 15° and extending outwardly of said holder end face, said portion of said sidewall which forms the cutting edge forming a clearance face which lies at an angle of less than 15° to the end of the holder and the end face of said insert which forms the cutting edge forming an axial rake face;
   each said insert being mounted in a pocket in the end face of the holder, said pocket including a deep portion for receiving a wedge and a contiguous shallower portion for retaining a cutting insert, the insert retaining portion including a flat side wall and the wedge receiving portion of the pocket including a concave side wall portion opposite said flat side wall and a bottom wall with a threaded hole extending thereinto,
   and a wedge mounted in each wedge receiving portion, said wedge including a first side face with a convex projection for movement upwardly and downwardly along said concave side wall portion, a flat second side face opposite the first side face for engaging a side face of an insert, a shoulder projecting outwardly from one end of said flat second side face to engage an end edge of an insert to hold the insert firmly between the shoulder and the pocket outer abutment wall and a hole extending vertically through the wedge,
   whereby a screw extending through said wedge hole and into the threaded recess in the bottom of the pocket pulls the wedge downwardly in an inclined direction wedging the insert against the pocket flat side wall and against the outer abutment wall, thereby precisely locating each insert both axially and radially.

2. A face milling tool according to claim 1 wherein the axial spacing between successive inserts is up to 0.01 inch.

3. A face milling tool according to claim 1 wherein the axial spacing between successive inserts is in the range of 0.002 to 0.005 inch.

4. A face milling tool according to claim 1 wherein the inserts are square.

5. A face milling tool according to claim 1 wherein the rake angle and radial shear angle are each about 7°.

* * * * *